United States Patent [19]

Muller

[11] Patent Number: 4,779,919

[45] Date of Patent: Oct. 25, 1988

[54] VEHICLE WINDSHIELD MOUNTING

[75] Inventor: Helmut E. Muller, Russelsheim, Fed. Rep. of Germany

[73] Assignee: General Motors Corporation, Detroit, Mich.

[21] Appl. No.: 939,431

[22] Filed: Dec. 8, 1986

[30] Foreign Application Priority Data

Dec. 12, 1985 [DE] Fed. Rep. of Germany ....... 3543815

[51] Int. Cl.$^4$ .............................................. B60J 1/04
[52] U.S. Cl. .................... 296/201; 296/96.21; 52/208; 52/766; 52/768; 156/108; 411/538; 29/468; 269/231; 269/235
[58] Field of Search ............... 296/84 R, 84 A, 84 D, 296/93, 201; 52/208, 217, 766, 768; 269/231, 235; 156/108; 29/468, 281.5; 411/535, 537, 538, 546, 531 (U.S. only)

[56] References Cited

U.S. PATENT DOCUMENTS

| 1,769,705 | 7/1930 | McGee | 411/531 |
| 2,242,363 | 5/1941 | Michon | 29/240 |
| 3,122,048 | 2/1964 | Warner | 29/240 X |
| 3,760,659 | 9/1973 | Campbell | 81/176.15 |
| 4,309,123 | 1/1982 | Moore | 29/240 X |
| 4,561,689 | 12/1985 | Sprenger | 296/84 A |
| 4,582,156 | 4/1986 | Kochy et al. | 296/194 X |
| 4,597,461 | 7/1986 | Kochy et al. | 296/194 X |
| 4,659,138 | 4/1987 | Gosse et al. | 296/201 |

FOREIGN PATENT DOCUMENTS

| 2219189 | 6/1979 | Fed. Rep. of Germany . |
| 2723255 | 7/1979 | Fed. Rep. of Germany . |
| 7933956 | 3/1980 | Fed. Rep. of Germany . |
| 3008557 | 9/1981 | Fed. Rep. of Germany . |
| 3008551 | 10/1981 | Fed. Rep. of Germany . |
| 3433784 | 3/1986 | Fed. Rep. of Germany . |
| 796498 | 1/1981 | U.S.S.R. | 411/539 |
| 189990 | 12/1922 | United Kingdom | 411/538 |

Primary Examiner—Dennis H. Pedder
Attorney, Agent, or Firm—Charles E. Leahy

[57] ABSTRACT

A device for securing a motor vehicle windshield has rotatable eccentric members which serve as a means to raise the windshield from an initial installation position into a final position. The eccentric member is arranged on a rotatable spacer which is non-uniform in thickness. This arrangement provides that the gap between the inner windshield surface and the windshield frame can also be adjusted.

2 Claims, 2 Drawing Sheets

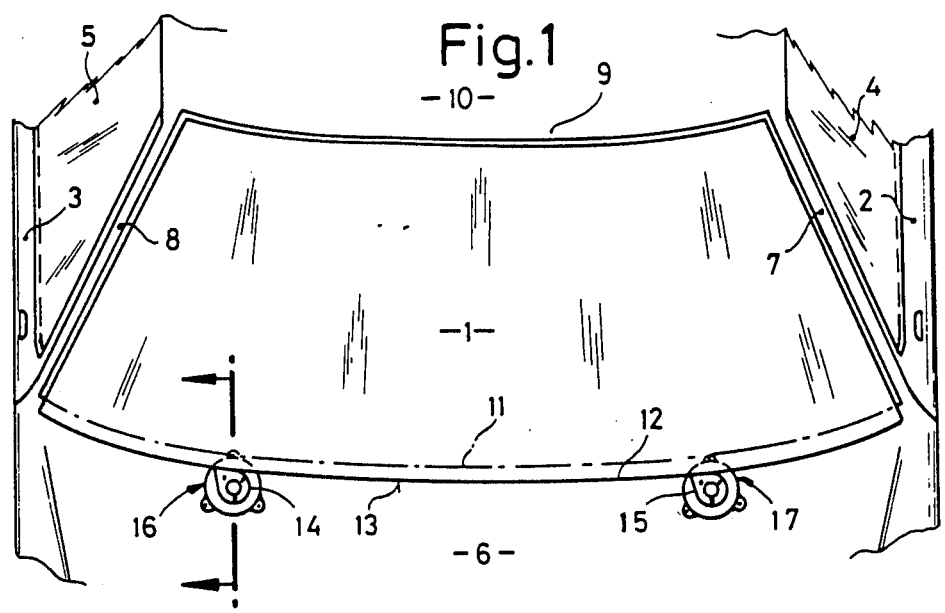
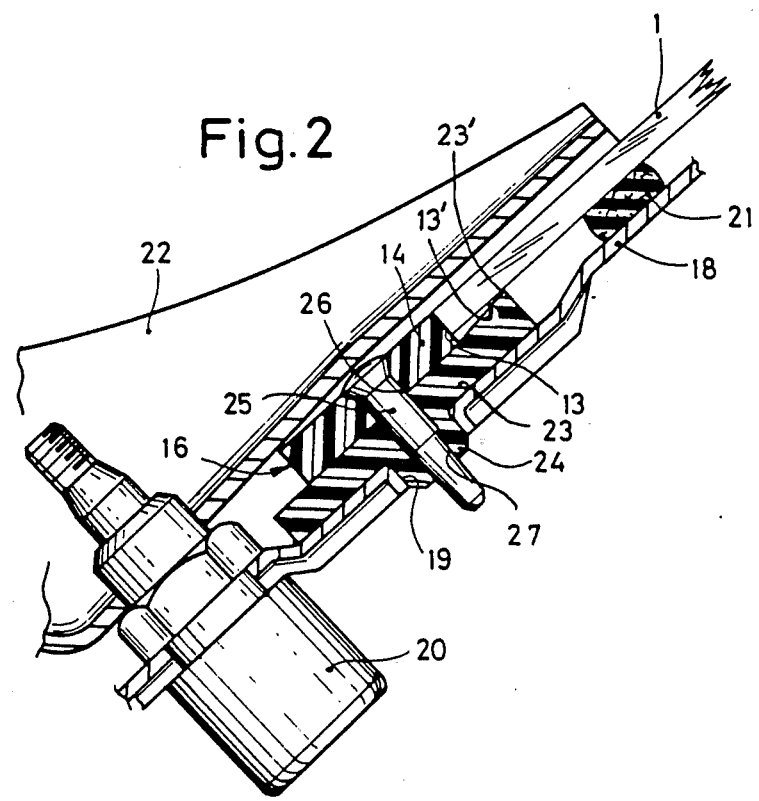

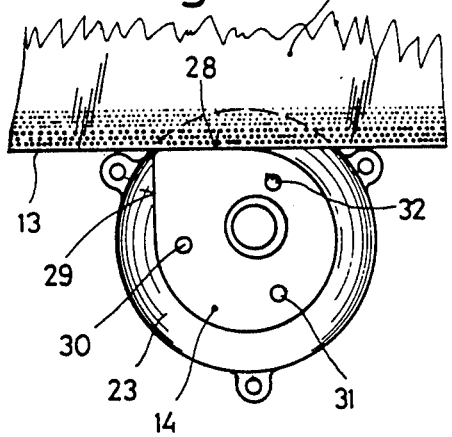
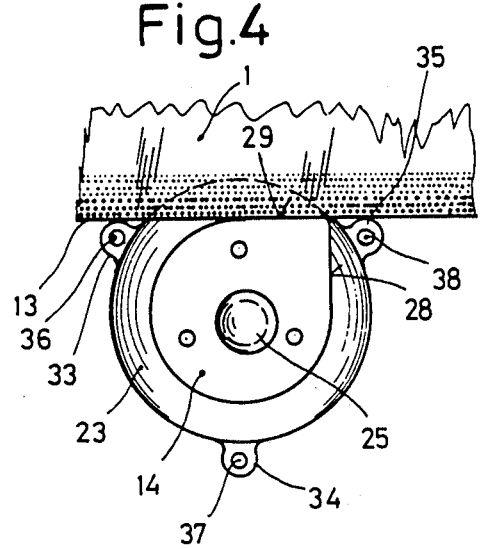

VEHICLE WINDSHIELD MOUNTING

The invention relates to a device for mounting a motor vehicle windshield into a frame comprised of frame side portions and an upper frame portion, said windshield being in engagement with the frame portions through an elastic sealing strip, and being supported at its lower edge by rotatable and lockable eccentric members which are secured to portions of the vehicle body and which enable upward adjustment of the windshield when the same is installed into the windshield opening.

BACKGROUND OF THE INVENTION

A device of this type is disclosed in the German Offenlegungsschrift DE-OS No. 32 43 101, which corresponds to U.S. Pat. No. 4,561,689. The present invention also relates to a method of installing such a window.

A new vehicle assembly technique, as shown in U.S. Pat. Nos. 4,582,156 and 4,597,461 involves the use of a so-called cockpit module, i.e., a unit comprised of a wall with pre-assembled components mounted on the engine and the occupant compartment side. During vehicle assembly, this unit is moved from the vehicle driver side through the door opening into the vehicle and is then fastened inside of the vehicle to the vehicle body. Experience has been that in the course of this assembly procedure the dashboard sometimes comes to be located too close to the windshield. This will sometimes cause friction to occur between these two components when, during vehicle operation, the vehicle body is subjected to twisting, and it may result in squeaking noises. One remedy that has been employed in an effort to overcome this problem is to reduce the dimension of the dashboard and to fill in the resulting gap, which is sometimes 7 mm. wide, with a sealant or other type of gap-filling strip. However, the employment of a sealing strip is associated with increased costs in terms of labor and material and is not very pleasing to the eye.

It is the object of the present invention to provide a windshield mounting device of the type described in the foregoing which serves as a means not only to adjust the windshield to its proper height position, but also to enable accurate spacing of the windshield from the dashboard. The present invention also teaches a method of installing a windshield with the help of a device of this type.

This object is achieved in accordance with the invention in that the windshield is installed so that the marginal inner face of the windshield bears upon spacers whose thickness can be adjusted.

The arrangement of providing adjustable spacers enables the lower edge of the windshield, after installation of the cockpit module into the vehicle, to be slightly displaced in the forward direction, so that a sufficiently wide gap will be created between the dashboard and the windshield. This will prevent the dashboard from bearing against the windshield so that squeaking noises, due to friction between these two components, are effectively eliminated.

Thanks to the invention, the filling or sealing strip between the dashboard and the windshield can be eliminated, and the gap is not noticeable any more, because the spacers between the dashboard and the windshield can now be adjusted by eye.

SUMMARY OF THE INVENTION

According to one arrangement which is characterized by its simplicity, the spacers are in the form of rotatable disks which are progressively increasing in thickness along their circumference. This arrangement enables infinitely variable adjustment of the windshield in the direction perpendicularly to the windshield plane. Instead of being a one-piece disk, the spacer may also be in the form of two superposed disks which are of mirror image configuration. In this instance, the outer surfaces of the disks would be parallel to each other.

In accordance with a further modification of the invention, each of the eccentric members is arranged on one respective spacer. This arrangement will enable the windshield to be adjusted both upwardly and forwardly by one single adjusting device, and only two apertures need be provided in the vehicle body for supporting the two devices made according to the invention.

Forward displacement of the windshield may be effected by way of a simple hook wrench having pins arranged thereon. The use of such a hook wrench as a means to drive the windshield securing device is rendered possible because the spacers are provided with outwardly directed cams, each of said cams having formed therein suitable key holes which enable turning of the spacers.

The spacers can be mounted without the use of tools if they are provided with a hollow cylindrical extension which enable snap-on connection to the body panel.

The windshield securing device can be locked into its adjusted position in a relatively simple manner if the respective eccentric member is pivotally mounted by means of a spreader pin which is seated in a bore of the eccentric member and the spacer, and which, for the purpose of locking the respective spacer and the associated eccentric member into their respective position, is adapted to be driven from an initial position further into the bore Instead of the spreader pin, one can also use a simple shaft if the need for a locking means is not considered critical. In the majority of cases, the eccentric member need not be locked into position, because it is flat enough for use as an installation assist means.

The configuration selected for the spacers may vary. The invention proposes that the spacers and the associated eccentric members be of a type wherein the eccentric members are in engagement with plane-parallel portions of the spacers, and wherein the spacers are ascending on one side outside of the engagement portion in a wedge-like manner.

The other object of the invention, namely that of providing a method of installing the windshield, is achieved in that rotatable and lockable eccentric members, which serve as a means to effect height adjustment of the windshield, are inserted into the panel underneath the windshield, and in that rotatable spacers are inserted which are adjustable in thickness and which have the marginal portions of the inside surface of the windshield bearing thereagainst, and in that these eccentric members and spacers as well as their shafts can be removed and re-used once the adhesive material has dried.

Since it takes only a few hours for the adhesive material to cure, the windshield securing devices according to the invention can be removed when the vehicle arrives at the end of the assembly line Thus, the arrangement according to the invention obviates the need of providing new windshield securing devices for each vehicle that is being assembled.

BRIEF DESCRIPTION OF THE DRAWINGS

It should be appreciated that a variety of arrangements may be utilized in the practice of the invention. One exemplary embodiment is illustrated in the drawings and described in the following:

In the drawings:

FIG. 1 is a front portion of a passenger car and a top view of the windshield;

FIG. 2 is a sectional view of the device according to the invention along line II—II of FIG. 1;

FIG. 3 is a front view of the device according to the invention, illustrating its initial position, i.e., the position of the windshield at the time it is inserted into the frame, and FIG. 4 is the arrangement according to FIG. 3, illustrating the device in its final position.

DESCRIPTION OF THE PREFERRED EMBODIMENT

FIG. 1 illustrates the windshield 1 of a motor vehicle, two doors 2, 3, side windows, 4, 5 and an engine hood 6. The windshield frame is formed by the profiled portions (not illustrated) of two roof pillars 7, 8 and a transverse member 9 of a vehicle roof 10. The dash-dotted line 11 in FIG. 1 indicates the final position of the windshield 1, while the solid line 12 indicates the windshield in a position prior to the windshield mounting procedure. It is also apparent from FIG. 1 that the windshield 1 is supported at its lower edge 13 on eccentric members 14, 15 of two devices 16, 17 which constitute an important part of the invention. If the eccentric members 14, 15 are turned counter-clockwise by 180° with the help of a tool, the windshield will be lifted and will assume its final position indicated by the dash-dotted line.

FIG. 2 illustrates the configuration of the device 16, which is identical to the device 17. One will note the lower portion of the windshield 1 which is supported at its lower edge 13 by the eccentric member 14. FIG. 2 also illustrates a portion of a body panel 18 which is provided with an opening 19 for accommodating the device 16. The body panel 18 is provided with a further opening for accommodating the usual windshield wiper motor 20. The windshield 1 is fastened to the body panel 18 by means of a layer of adhesive 21, and a panel 22, which extends past the adhesive 21, serves to conceal the lower edge of the windshield.

The device 16 proposed by the invention includes a spacer 23 which lies flat on the outer surface of the body panel 18, and which has a hollow cylindrical portion 24 extending through the opening 19. The spacer 23 is progressively increasing in thickness around its circumference, as at 23'. In FIG. 2, the thicker portion 23' of the spacer 23 is facing and supporting the windshield 1. If the spacer 23 were to be turned by 180°, the marginal inner face 13' of windshield 1 would come to lie against the thinner portion of the spacer 23 and, consequently, would be positioned closer to the body panel 18. In this exemplary embodiment, the eccentric member 14 lies flat with its bottom portion against a plane-parallel portion of the spacer 23. This, as seen in FIG. 2, is the portion of the spacer 23 located outside of the engagement surface which increases progressively in thickness in the radial direction and, as viewed in cross section, assumes a wedge-like configuration. The eccentric member 14 is pivotally mounted on the spacer 23 by means of a spreader pin 25 which is guided through a bore 26 in the eccentric member 18 and a bore 27 in the spacer 23. This spreader pin 25 forms the shaft of the eccentric member 14. One procedure is to drive the pin 25 immediately into the bores 26, 27 and another is to initially insert the pin only partially into the bores 26, 27 to facilitate turning of the spacer 23 and the eccentric member 14 and, after the windshield 1 has been adjusted to its final installation position, to force it completely into the bores 26, 27 so as to expand the hollow cylindrical portion radially outward into a press fit relationship with the wall of the panel 18 defining the opening 19 and thereby prevent any later rotary movement by the eccentric member 14 and the spacer 23. Alternatively, the fastening means on the shaft may be omitted entirely, because the eccentric members are flat enough and the device is actually only an installation assist means to position the windshield until the adhesive 21 cures.

It is apparent from FIG. 3 that the eccentric member 14 is of cam-like configuration and that it has two windshield supporting surfaces 28, 29 which form an acute angle. In the position illustrated in FIG. 3, the windshield 1 rests on the supporting surface 28 The end surface of the eccentric member is provided with three holes 30, 31, 32 into which the pins of a tool (not shown) are able to engage, so that the eccentric member 14 can be turned by about 270. until the windshield supporting surface 29 bears against the lower edge 13 of the windshield 1 and has lifted the same. This raised position, which corresponds to the final installation position, is illustrated in FIG. 4.

It is also apparent from FIGS. 3 and 4 that the circumferential surface of the spacr 23 has arranged thereon three lugs which are identified in FIG. 4 by the numerals 33, 34, 35, each lug being provided, respectively, with holes 36, 37, 38. These lugs 33, 34, 35 and holes 36, 37, 38 enable the spacer 23 to be turned by means of a tool so that the gap between the windshield 1 and the body panel 18 (FIG. 2) can be widened. This adjustment is to be made after installation of the cockpit module into the vehicle and before the adhesive material is dry. As soon as the adhesive material is dry, the windshield securing devices proposed by the invention are not needed any longer. This will enable the devices to be removed when the vehicle reaches the end of the assembly line, and to be re-used thereafter, if desired.

The embodiments of the invention in which an exclusive property or privilege is claimed are defined as follows:

1. A device for adjusting the position of a vehicle window having a lower edge and a lower margin facing inwardly, upon a vehicle frame including side frames and a top frame and a sheet metal body panel at the lower edge and lower margin of the window, comprising:

an eccentric member having an outer periphery adapted to support the lower edge of the window and serve to lift the window upon rotary movement of the eccentric member;

a spacer member having a non-uniform thickness adapted to support the lower margin of the window and serve to adjust the window spacing with respect to the body panel upon rotary movement of the spacer member;

and said eccentric member and said spacer member being mounted one atop the other and having coaxially aligned apertures receiving a pin to rotatably mount the members upon the body panel.

2. The device of claim 1 further characterized by said pin being a spreader pin adapted to lock the relative rotary positions of the members relative one another and the body panel.

* * * * *